US011069372B2

(12) United States Patent
Hori et al.

(10) Patent No.: US 11,069,372 B2
(45) Date of Patent: Jul. 20, 2021

(54) INFORMATION PROVIDING APPARATUS

(71) Applicant: TOYOTA JIDOSHA KABUSHIKI KAISHA, Toyota (JP)

(72) Inventors: Takashige Hori, Aisai (JP); Makoto Akahane, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 85 days.

(21) Appl. No.: 16/176,868

(22) Filed: Oct. 31, 2018

(65) Prior Publication Data

US 2019/0198041 A1 Jun. 27, 2019

(30) Foreign Application Priority Data

Dec. 27, 2017 (JP) ............................ JP2017-251312

(51) Int. Cl.

| | |
|---|---|
| ***G10L 25/63*** | (2013.01) |
| ***G06K 9/00*** | (2006.01) |
| ***G10L 25/90*** | (2013.01) |
| ***G10L 15/04*** | (2013.01) |
| ***B60W 40/09*** | (2012.01) |
| ***B60R 11/02*** | (2006.01) |
| ***G06Q 50/00*** | (2012.01) |
| ***G10L 25/78*** | (2013.01) |
| *B60W 40/08* | (2012.01) |

(52) U.S. Cl.

CPC .......... *G10L 25/63* (2013.01); *B60R 11/0247* (2013.01); *B60W 40/09* (2013.01); *G06K 9/00845* (2013.01); *G06Q 50/01* (2013.01); *G10L 15/04* (2013.01); *G10L 25/78* (2013.01); *G10L 25/90* (2013.01); *B60W 2040/089* (2013.01); *B60W 2040/0872* (2013.01)

(58) Field of Classification Search

CPC ...... G06F 3/0484; G06F 3/0488; G06F 13/14; H04W 4/48

See application file for complete search history.

(56) References Cited

U.S. PATENT DOCUMENTS

| | | | | |
|---|---|---|---|---|
| 2012/0158845 A1* | 6/2012 | Baalu | ..................... | G06Q 30/02 709/204 |
| 2013/0191758 A1 | 7/2013 | Nanba | | |
| 2017/0032186 A1* | 2/2017 | Murata | .................. | G06F 3/002 |

(Continued)

FOREIGN PATENT DOCUMENTS

| | | |
|---|---|---|
| JP | 2012-008969 A | 1/2012 |
| JP | 2013-092948 A | 5/2013 |

(Continued)

*Primary Examiner* — Marl Villena

(74) *Attorney, Agent, or Firm* — Hunton Andrews Kurth LLP

(57) ABSTRACT

An in-vehicle apparatus 100 collects a user's voice at predetermined time intervals by using, for example, microphones, and transmits the voice to an analysis server 200 as audio data. The analysis server 200 extracts features of the user's voice, such as tone, pitch and speech intervals, from the received audio data, and analyzes and determines the user's feeling based on the extracted features of the voice so as to generate feeling state information and to send it back to the in-vehicle apparatus 100. The in-vehicle apparatus 100 refers to the feeling state information and thereby gives a content modification to content that has been automatically generated.

13 Claims, 9 Drawing Sheets

| <WHEN USER'S FEELING IS "PLEASURE"> | <WHEN USER'S FEELING IS "DISPLEASURE"> |
|---|---|
| "YEAH! I WILL GO TO (ODAIBA) TODAY!(^^)!" | "I WILL GO TO (ODAIBA) TODAY…OH, NO (+_+)" |

(56) References Cited

U.S. PATENT DOCUMENTS

| | | | | |
|---|---|---|---|---|
| 2017/0103756 | A1 | 4/2017 | Kobayashi et al. | |
| 2017/0177884 | A1* | 6/2017 | Mehta | A61B 5/165 |
| 2018/0005272 | A1* | 1/2018 | Todasco | G06K 9/00302 |
| 2018/0059885 | A1* | 3/2018 | Gonnen | H04L 51/32 |
| 2018/0174457 | A1* | 6/2018 | Taylor | G08G 1/0962 |

FOREIGN PATENT DOCUMENTS

| | | | |
|---|---|---|---|
| JP | 5630577 | B | 11/2014 |
| JP | 2015018421 | A | 1/2015 |
| WO | 2015178078 | A1 | 11/2015 |
| WO | 2016002251 | A1 | 1/2016 |

* cited by examiner

1000;INFORMATION PROVIDING SYSTEM
200;ANALYSIS SERVER
300
POSTING SERVER
N
100
400
100
400
100
400

| TEMPLATE | INFORMATION TYPE | |
|---|---|---|
| "I WILL GO TO "VARIABLE" TODAY" | (DESTINATION) | TI1 |
| "I AM GOING TO DO "VARIABLE" TODAY" | (SCHEDULE) | TI2 |
| "SUDDENLY, "VARIABLE 1" HAPPENED AT "VARIABLE 2"" | (CURRENT POSITION), (WEATHER INFORMATION) | TI3 |
| "WOW, I HAD TO BRAKE HARD ..., I NEED TO DRIVE SAFELY" | — | TI4 |
| "I WILL ARRIVE AT "VARIABLE 1" "VARIABLE 2"" | (DESTINATION), (TRAFFIC INFORMATION) | TI5 |

Figure 6:
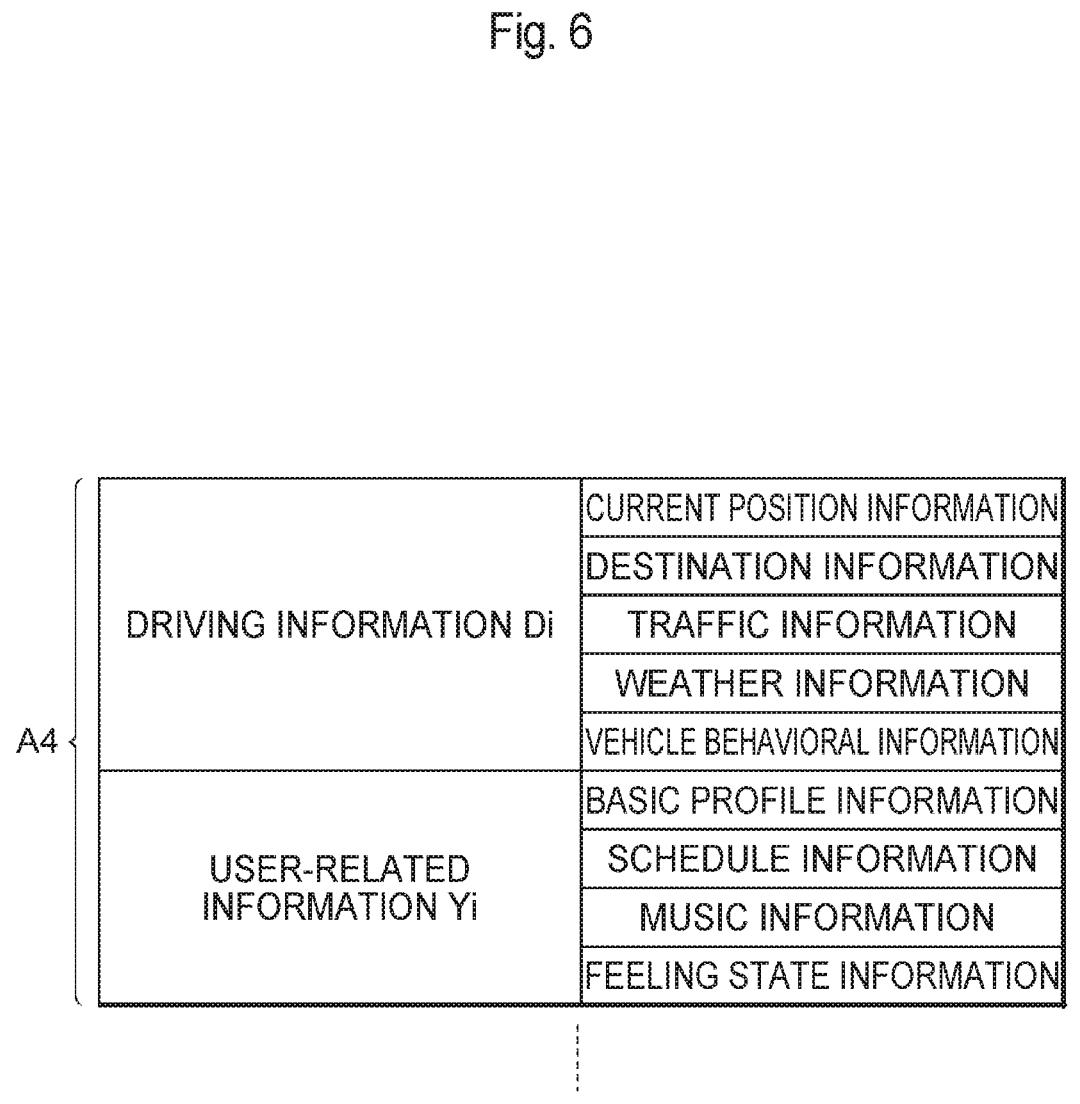

| | |
|---|---|
| DRIVING INFORMATION Di | CURRENT POSITION INFORMATION |
| | DESTINATION INFORMATION |
| | TRAFFIC INFORMATION |
| | WEATHER INFORMATION |
| | VEHICLE BEHAVIORAL INFORMATION |
| USER-RELATED INFORMATION Yi | BASIC PROFILE INFORMATION |
| | SCHEDULE INFORMATION |
| | MUSIC INFORMATION |
| | FEELING STATE INFORMATION |

| VALUE OF FLAG | DESCRIPTION |
|---|---|
| 「1」 | AUTOMATIC POSTING WITHOUT USER'S CONFIRMATION |
| 「0」 | MANUAL POSTING BY USER |

INFORMATION PROVIDING APPARATUS

CROSS-REFERENCE TO RELATED APPLICATION

This application relates to and claims priority from Japanese Patent Application No. JP2017-251312, filed on Dec. 27, 2017, the entire disclosure of which is incorporated herein by reference.

BACKGROUND

Field

The present invention relates to content generation and posting techniques suited for users who generate and post content while they are in a vehicle.

Description of Related Art

Recently, services involving posting of content (which are also called social media services), such as blogging services, chatting services, and other social networking services (SNS), including Twitter® and Facebook®, have become widespread as communication tools that can replace communications through email. Users post their content on a posting server with their computers or mobile devices at home. Some users further wish to create posts and submit them even when they are driving a car, by accessing the posting server from the car.

To respond to such needs, JP2012-008969 A discloses a technique of generating content including navigation information, such as positioning information and rainfall information, by using a navigation system installed in a vehicle, and automatically submitting the generated content on a posting site. The disclosed technique generates content by using not only the navigation information, but also using the user's profile information, such as the user's name, age, gender, selected writing style for posting, etc., which indicates the characteristics of the writer of the post.

SUMMARY

However, according to the technique disclosed in JP2012-008969 A, the user's profile information is updated only when a user rewrites their own information. In fact, users rarely update or rewrite their profile information once they have set and entered the same. For this reason, the content generated by using such profile information can often be monotonous and with little variation.

The present invention has been made in view of the above-described circumstances. An object of the invention is to provide a content generation and posting technique that allows users to generate and post unique content that vividly reflects the real-time feelings of the users.

According to an aspect of the invention, an information providing apparatus is provided, and the apparatus is characterized in that it comprises: an acquisition section that acquires driving-related information and/or user-related information, wherein the driving-related information is related to driving of a vehicle and the user-related information is related to a user in the vehicle; an input section that inputs biological data of the user; a transmission section that transmits the input biological data to an analysis server; a reception section that receives, from the analysis server, a result of analysis of the user's feeling, the analysis being made by the analysis server based on the biological data; a generation section that generates content based on the acquired driving-related information and/or user-related information and based on the received result of analysis of the user's feeling, so that the content reflects the result of analysis of the user's feeling; and a posting control section that transmits the generated content to a posting site.

According to another aspect of the invention, a computer-readable storage medium is provided which stores a program executed by an information providing apparatus. The storage medium is characterized in that the program stored thereon causes the information providing apparatus to function as: an acquisition section that acquires driving-related information and/or user-related information, wherein the driving-related information is related to driving of a vehicle and the user-related information is related to a user in the vehicle; an input section that inputs biological data of the user; a transmission section that transmits the input biological data to an analysis server; a reception section that receives, from the analysis server, a result of analysis of the user's feeling, the analysis being made by the analysis server based on the biological data; a generation section that generates content based on the acquired driving-related information and/or user-related information and based on the received result of analysis of the user's feeling, so that the content reflects the result of analysis of the user's feeling; and a posting control section that transmits the generated content to a posting site.

BRIEF DESCRIPTION OF DRAWINGS

FIG. 5 shows examples of templates, each describing a sample sentence for content that is subject to automatic posting.

FIG. 6 illustrates examples of various types of information stored in the storage area.

FIG. 9 shows an example of an automatic posting flag.

DETAILED DESCRIPTION

Hereinafter, embodiments of the present invention will be specifically described with reference to the attached drawings. In the below description, the same elements will be given the same reference signs and any repetitive descriptions will be omitted.

A. Present Embodiment

Figure 1:
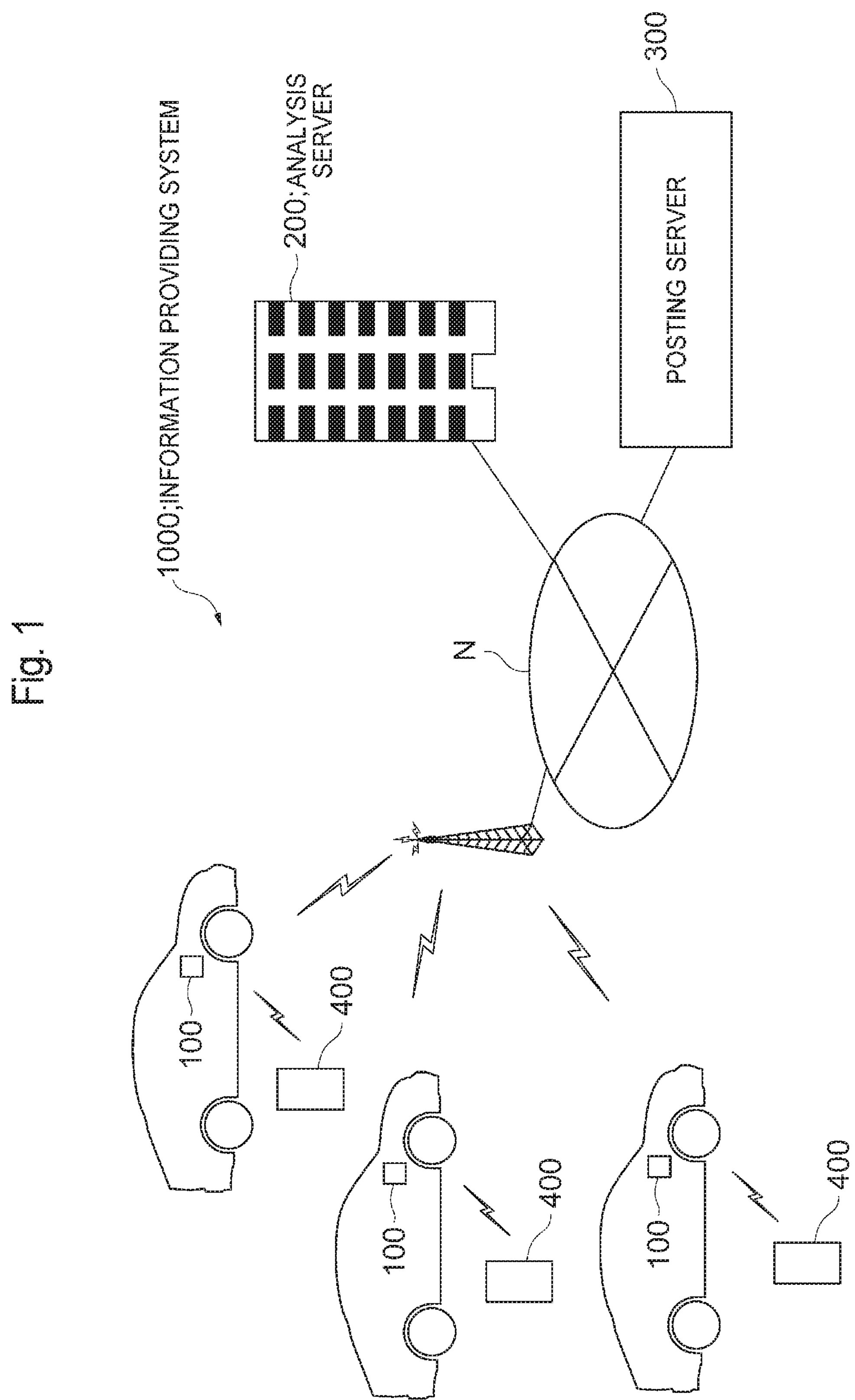
FIG. 1 schematically illustrates the configuration of an information providing system according to an embodiment of the present invention.

FIG. 1 schematically illustrates the configuration of an information providing system 1000 according to the present embodiment. The information providing system 1000 shown in FIG. 1 is configured to include: an in-vehicle apparatus (information providing apparatus) 100 installed in a vehicle; an analysis server 200 that analyzes the voice of a user (e.g., a driver of a vehicle) that is sent through the in-vehicle apparatus 100 and determines the feeling of the user; a posting server 300 on which content is posted through the in-vehicle apparatus 100, the content reflecting the result of analysis of the user's feeling; and a mobile terminal 400 held by the user.

The in-vehicle apparatus 100, the analysis server 200, the posting server 300, and the mobile terminal 400 can communicate with each other via a communication network N. Such communication network N may be a wired or wireless network, and examples may include the internet, a LAN, a leased line, a telephone line, a company intranet, a mobile communication network, Bluetooth, WiFi (Wireless Fidelity), and other communication networks, as well as any combinations of the above.

Figure 2:
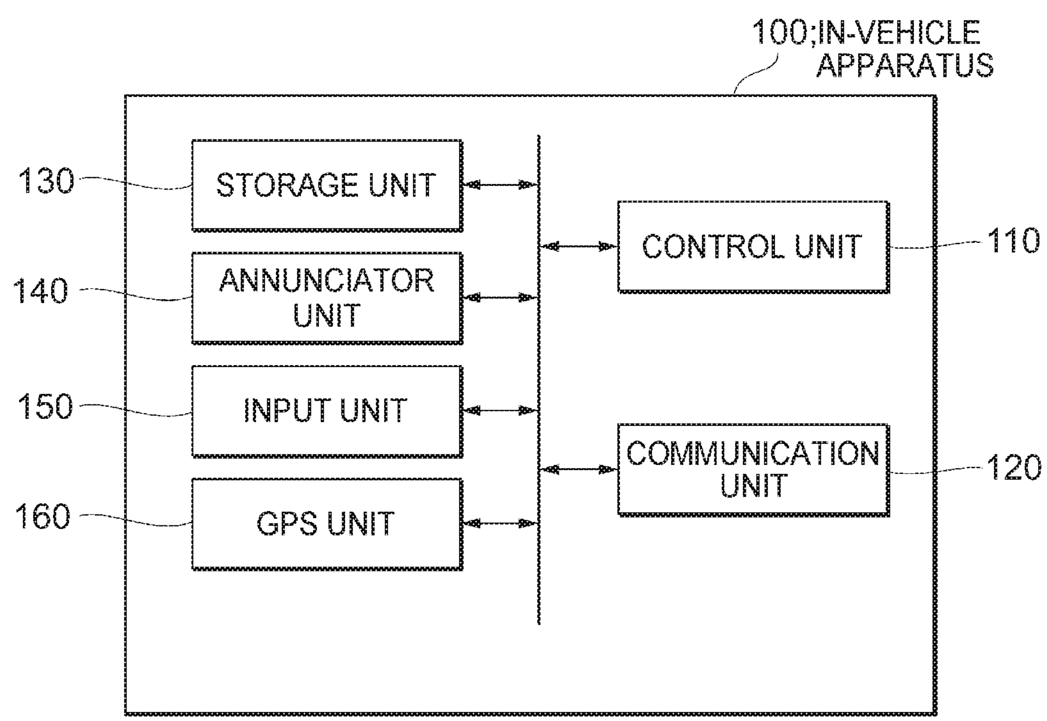
FIG. 2 is a block diagram showing the configuration of an in-vehicle apparatus.

FIG. 2 is a block diagram illustrating the configuration of the in-vehicle apparatus 100.

The in-vehicle apparatus 100 is configured to include a control unit 110, a communication unit 120, a storage unit 130, an annunciator unit 140, an input unit 150 and a GPS unit 160.

The control unit 110 includes, for example, a micro controller unit (MCU), and such MCU has a CPU, a ROM, a RAM, etc., as major components thereof. The control unit 110 performs overall control of each part of the in-vehicle apparatus 100 by executing various programs, etc., stored in the ROM and RAM.

The communication unit 120 has communication interfaces that meet various standards for communication. The communication unit 120 sends/receives data to/from the analysis server 200, the posting server 300, and other external devices, including the mobile terminal 400 held by the user, via the communication network N. Herein, examples of the mobile terminal 400 include smartphones, mobile phones, portable digital assistants (PDAs), tablets, personal computers (PCs), notebook PCs, and any other devices that can exchange data with external devices through the communication network N.

The storage unit 130 is configured to include a storage medium, such as a hard disk or a semiconductor memory, and a drive device for the storage medium. The storage unit 130 stores various programs and data necessary for the control unit 110 to perform overall control of the in-vehicle apparatus 100, and such programs and data stored in the storage unit 130 are updatable.

The annunciator unit 140 is configured to include, for example, a display (e.g., a liquid crystal panel) and loudspeakers. Under the control by the control unit 110, the annunciator unit 140 displays (informs the user of) characters and figures, etc., on the display and outputs (informs the user of) voice messages and sound effects through the loudspeakers.

The input unit 150 is configured to include, for example, microphones for collecting the voice of the user (e.g., the vehicle driver) and other control elements, such as control keys, control buttons and touch sensors.

The GPS unit 160 is configured to acquire the positioning information indicating the current position (e.g., the latitude and longitude) of the vehicle by use of the information provided from the satellites of the Global Positioning System (GPS).

The analysis server 200 has the feature of determining the feeling of the user based on the user's audio data sent from the in-vehicle apparatus 100. The analysis server 200 may be comprised of, for example, a computer with high computing capacity. Although the analysis server 200 may be a single computer, the analysis server 200 is not limited thereto, and may also be comprised of a plurality of computers distributed on the communication network N.

Figure 3:
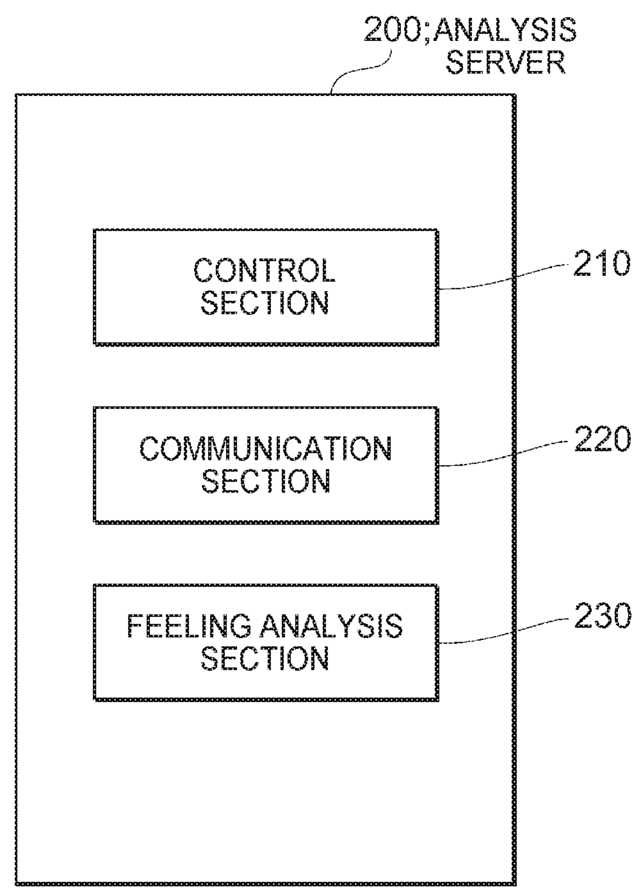
FIG. 3 is a block diagram showing the functional configuration of an analysis server.

FIG. 3 is a block diagram showing the functional configuration of the analysis server 200.

The analysis server 200 is configured to have a control section 210, a communication section 220 and a feeling analysis section 230.

The control section 210 is configured to include an arithmetic/logical operation unit (e.g., a CPU) that performs arithmetic operations, logical operations, bit operations, etc., and storage means (such as a ROM and a RAM). The control section 210 performs overall control of each section of the analysis server 200 by executing various programs stored in the storage means (such as the ROM).

The communication section 220 includes communication interfaces that meet various standards for communication. The communication section 220 receives user's audio data that is sent from the in-vehicle apparatus 100 via the communication network N, and also transmits, to the in-vehicle apparatus 100, the results of feeling analysis that is conducted based on the user's audio data. The communication section 220 sends and receives various information to and from external devices, including the in-vehicle apparatus 100.

The feeling analysis section 230 extracts, from the user's audio data input through the communication section 220, features of the user's voice, such as tone, pitch and speech intervals, and determines and distinguishes the user's feeling based on the extracted features of the voice. The feeling analysis section 230 may be configured to distinguish the feelings of, for example, "pleasure," "fear," "surprise," "sadness," "displeasure," "anger" and "hope." However, the kinds and number of distinguishable feelings are not limited to the above, and may be set and modified as needed. After determining and distinguishing the user's feeling based on the extracted features of the voice, the feeling analysis section 230 sends the result of the analysis (for example, the feeling state of "pleasure") back to the in-vehicle apparatus 100.

The posting server 300 is a server providing a posting service. In the present embodiment, the in-vehicle apparatus 100 automatically generates content related to the user (such content will be hereinafter referred to simply as "content") and the resulting content is posted (uploaded) on the posting server 300 (the details thereof will be described later). Other users (e.g., the user's friends and family) who are using the same posting service can see the posted content by accessing the posting server 300. Examples of this type of posting service include blogging services, chatting services, message-board services, and other social networking services (SNS), like Twitter, Facebook, etc. The posting site used is not limited to the above and may be selected and determined as appropriate.

Next, the method for automatically generating content will be described.

Figure 4:
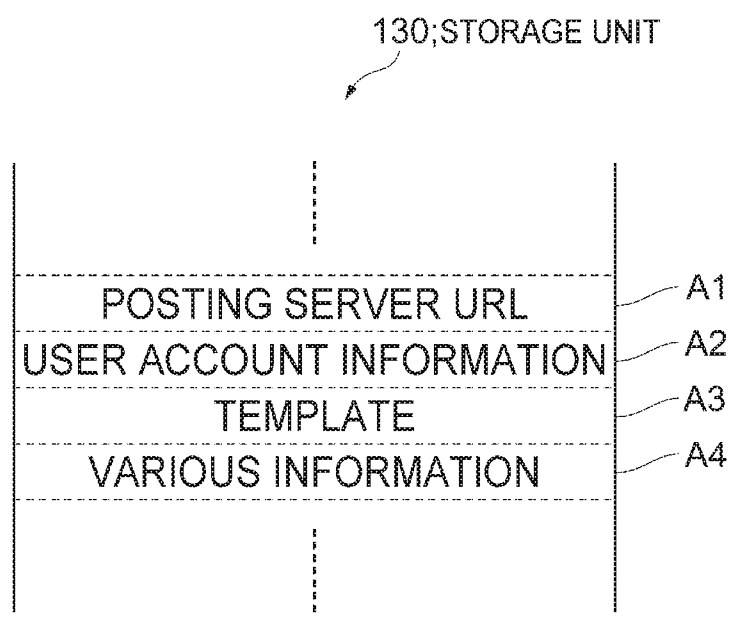
FIG. 4 illustrates an example of a storage area of a storage unit in the in-vehicle apparatus.

FIG. 4 illustrates an example of each of the storage areas prepared in the storage unit 130 of the in-vehicle apparatus 100. FIG. 5 is an illustration showing examples of templates TI, each describing a sample sentence for content that is subject to automatic posting.

As shown in FIG. 4, the storage unit (storage section) 130 includes, for example, a storage area A1 for storing the positional information (e.g., the URL (uniform resource locator) for the posting server 300, being the destination server of the posting of content, a storage area A2 for storing the user account information (e.g., user's ID and password) to be used to post content on the posting server 300, a storage area A3 for storing templates TI, and storage area A4 for storing other various types of information obtained within the in-vehicle apparatus 100 or from external devices.

As illustrated in FIG. 5, multiple types of templates TI are prepared in the present embodiment. Some of the templates TI include a "variable" portion accompanied by a specific information type, so that such specific type of information needs to be entered into the variable portion. When the control unit 110 obtains various types of information within the in-vehicle apparatus 100 or from external devices, the control unit 110 selects a corresponding template based on the obtained information and automatically generates content by inserting the obtained information into the specified portion (i.e., the "variable" portion) of the selected template.

For example, template TI1 is as follows: "I will go to "variable" (information type: destination) today." When the control unit (acquisition section) 110 acquires information indicating the destination (e.g., "Odaiba"), it enters "Odaiba" in the "variable" portion of template TI1, to thereby automatically generate the content (sentence): "I will go to (Odaiba) today."

As shown in FIG. 5, one template may have a single variable portion, or two or more variable portions. For example, template TI5 has two variables and reads: "I will arrive at "variable 1" (information type: destination) "variable 2" (information type: traffic information)." Accordingly, when the control unit (acquisition section) 110 acquires "Yokohama Arena" as information indicating the destination and "one hour late" as the traffic information, it enters the obtained information into each of the portions of variables 1 and 2 in template TI5, to thereby automatically generate the content (sentence): "I will arrive at (Yokohama Area) (one hour late)."

It should be noted here that the templates TI stored in the storage area A3 may be configured to allow editing (addition, deletion, etc.) by the posting service provider (e.g., the entity that operates the posting server 300) as appropriate. The templates TI may also be configured such that each user can edit the templates TI as appropriate through the user's operation on the in-vehicle apparatus 100, etc.

FIG. 6 shows examples of the various types of information stored in the storage area A4.

The information stored in the storage area A4 is largely divided into information related to the driving of the vehicle (driving-related information Di) and information related to the user (user-related information Yi).

The driving-related information Di may include: information indicating the current position of the vehicle, information on the destination of the vehicle and information on the traffic conditions around the vehicle, each of which is provided from the GPS unit 160; information about the weather around the current position, which is obtained through, for example, the website of a meteorological agency; and information regarding the behavior of the vehicle obtained via sensors, etc., provided in the vehicle.

The user-related information Yi may include the user's basic profile information (name, age, date of birth, address, telephone number, etc.), the schedule information indicating the user's schedule (for example, the schedule during a specified period of time), music information for identifying the music the user is listening to in the vehicle, and feeling state information indicating the specific feeling state that the user is currently in.

For example, the basic profile information can be recorded on the storage area A4 by the user in advance through the operation of the control buttons, etc., of the in-vehicle apparatus 100, and the recorded information can also be edited by the user through the operation of the buttons, etc. Regarding the schedule information, a calendar application installed on the in-vehicle apparatus 100 is synchronized with a scheduler application or other similar applications installed on the user's mobile terminal 400 at an appropriate timing. With this synchronization, the storage area A4 can hold the schedule information that reflects the user's latest schedule. As to the music information, a song is specified, for example, through the user's selection on the user's music play list, and the specified song is recorded in the storage area A4.

The feeling state information indicates the results of the analysis of the user's feeling, that are sent from the analysis server 200. Examples of the feeling state indicated by this information include "pleasure," "fear," "surprise," "sadness," "displeasure," "anger" and "hope." This feeling state information recorded in the storage area A4 is periodically updated at predetermined time intervals (e.g., every 20 minutes). The process of such update is as follows: The in-vehicle apparatus (input section, transmission section) 100 collects the user's voice (biological data) at predetermined time intervals through, for example, microphones, and transmits the collected voice as audio data to the analysis server 200. In response, the analysis server 200 extracts features of the user's voice, such as tone, pitch, and speech intervals, based on the obtained audio data, and analyzes and determines the user's feeling based on the extracted features of the voice, so as to thereby generate the feeling state information. The analysis server 200 then returns the obtained feeling state information to the in-vehicle apparatus 100. The in-vehicle apparatus (reception section) 100 updates the feeling state information stored in the storage area A4 every time it receives the feeling state information from the analysis server 200.

Figure 7A:
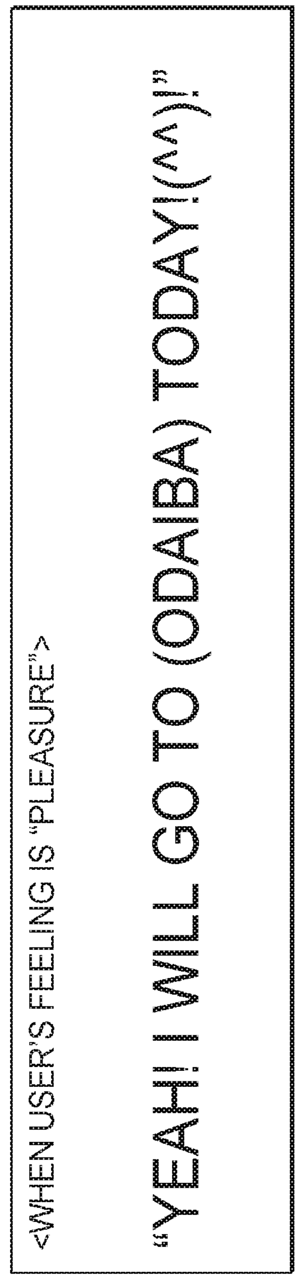
FIGS. 7A and 7B each illustrate an example of content that reflects the feeling state information generated by the in-vehicle apparatus.
Figure 7B:
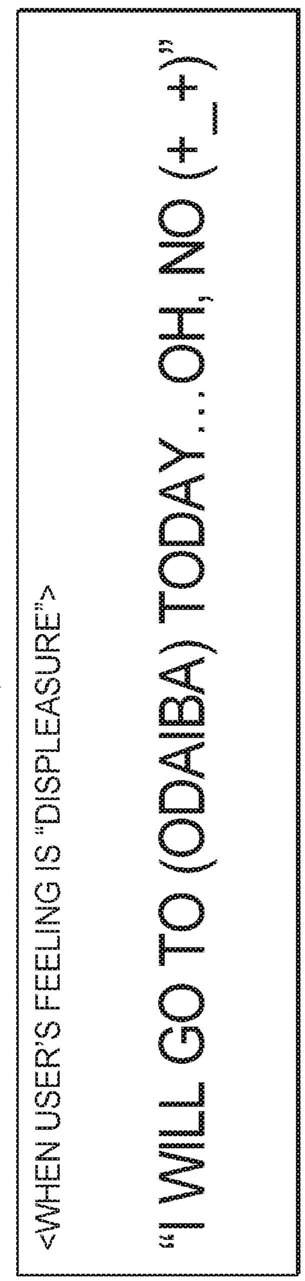

FIGS. 7A and 7B show examples of the content generated by the in-vehicle apparatus 100 with the feeling state information reflected in the content. Each of the examples shown in FIGS. 7A and 7B is generated by choosing the same template TI ("I will go to "variable" (information type: destination) today") and entering the same destination information ("Odaiba"), but the feeling state information differs between the content in FIG. 7A and the content in FIG. 7B.

As shown in FIGS. 7A and 7B, the present embodiment provides a different modification for the content according to the identified feeling (feeling state information) of the user. Such modification of content may include adding words ("Yeah!", "Oh no . . . ", etc.), signs ("!!!!!", "♪", etc.), and pictograms ("!(^^)", "(+_+)" etc.) to the content according to the feeling state information. The content modification may also be made by combining such words, signs and pictograms (which will also be collectively referred to as "emotional characters") as appropriate according to the feeling state information and adding them to the content.

More specifically, when it is determined that the user's feeling is "pleasure," the in-vehicle apparatus (generation section) 100 adds emotional characters associated with "pleasure" (e.g., "Yeah!", "♪", "!(^^)!") to the content (see FIG. 7A).

On the other hand, when it is determined that the user's feeling is "displeasure," the in-vehicle apparatus (generation section) 100 adds emotional characters associated with "displeasure" (e.g., "Oh no . . . ", " . . . ", "(+_+)") to the content (see FIG. 7B).

The above-described content modification enables the in-vehicle apparatus 100 to generate unique content that expresses the real-time feeling of the user. Accordingly, other users (for example, the user's family and friends) who access the posting server 300 to see the user's content can understand the user's feeling, impression, etc., in real time as if they were actually there. It should be noted here that the content modification may be made under given conditions that are determined as appropriate. For example, the content modification may be given when the content is automatically generated using a particular template (for example, template TI1 and template TI5 shown in FIG. 5). Additionally (or alternatively), the content modification may be given when the content is automatically generated during a specific time period (for example, from 6:00 to 8:00, and from 18:00 to 21:00).

Next, the processing for posting the automatically generated content will be described. The term "content" referred to in the below description means both content with content modification and content without any modification.

Figure 8:
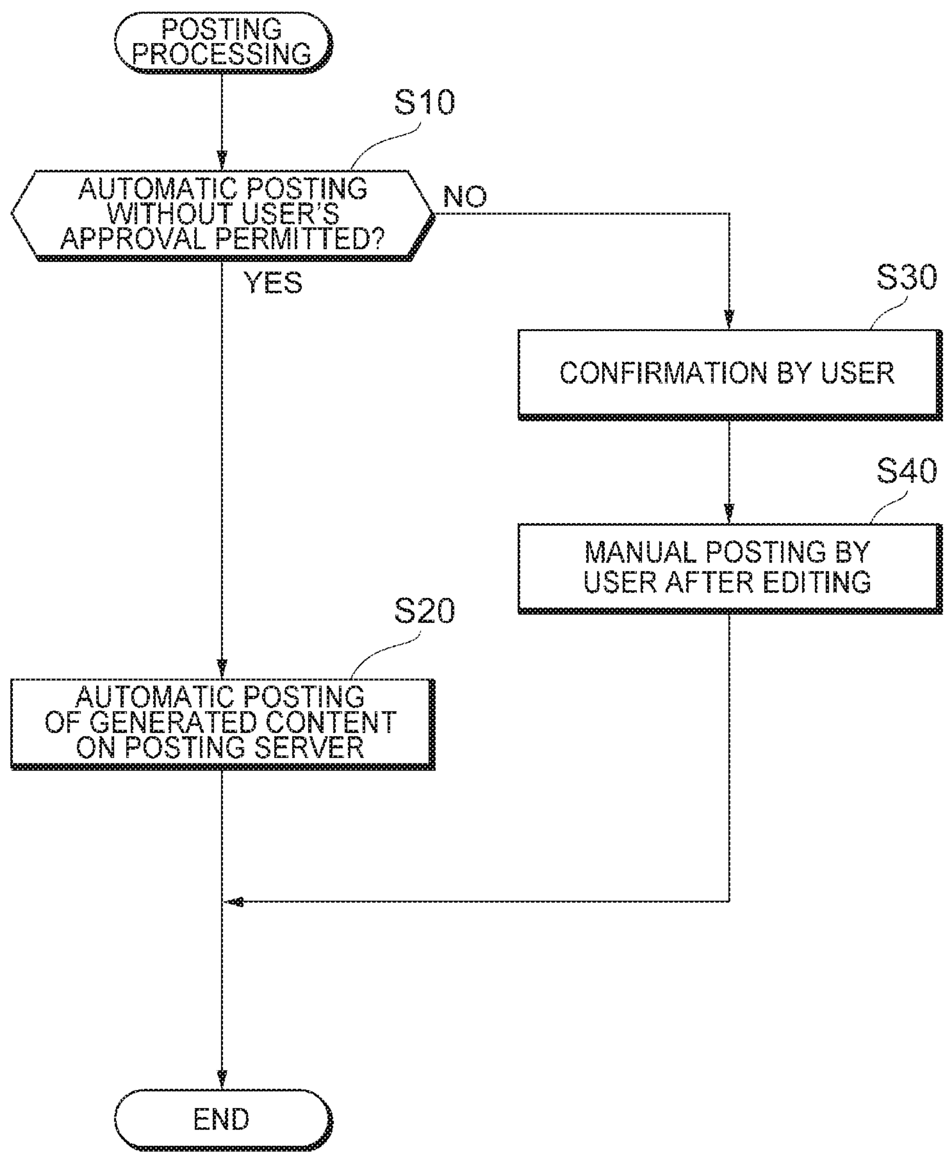
FIG. 8 is a flowchart showing the content posting processing.

FIG. 8 is a flowchart showing the content posting processing performed by the control unit (posting control section) 110.

When content is automatically generated, the control unit 110 refers to an automatic posting flag (a determination flag) stored in the storage unit (memory) 130, and determines whether the generated content may be posted automatically without consent from the user (step S10). FIG. 9 is an illustration showing an example of such automatic posting flag FI. When the automatic posting flag FI has a value of "1," posting is automatically performed without obtaining the user's confirmation; whereas, when the automatic posting flag FI has a value of "0," posting is performed only after confirmation by the user (in other words, the content is posted manually by the user). The value of the automatic posting flag FI may be set and changed by the user through an appropriate operation of the control buttons, etc. In this example, the automatic posting flag FI is assumed to have an initial value of "0"; however, the initial value may be set at "1."

When the control unit (posting control section) 110 determines that the content may be posted automatically according to the automatic posting flag FI having a value of "1" (YES in step S10), the control unit (posting control section) 110 automatically posts the generated content on the posting server 300, together with the user's account information, without obtaining the user's confirmation about the details of the automatically generated content (step S20), and, after that, ends the processing. The content uploaded (posted) on the posting server 300 is placed as a new post and becomes available to other users, so that other users can react to the post, such as by putting comments on the post.

When the control unit (posting control section) 110 determines that the content should not be automatically posted because of the automatic posting flag FI having a value of "0" (NO in step S10), the control unit (posting control section) 110 presents the generated content on the display and prompts the user's confirmation (step S30). When the control unit 110 detects the user's operation indicating that the user wishes to post the content manually after the process of editing, etc., by the user, the control unit 110 allows the content after such editing to be manually posted on the posting server 300, together with the user's account information (step S40), and then ends the processing.

As described above, the present embodiment enables switching between the automatic posting without approval from the user and the manual posting based on the user's operation. This configuration can prevent user's unwanted content from being automatically posted on the posting server 300, and can accordingly prevent any occurrence of problems due to such unwanted post. For example, if the automatically generated content includes user's private information (for example, if the content is as follows: "I am going on a date with (my girlfriend who lives in ______) today (^_-)") and if such content is automatically posted without the user's confirmation beforehand, such post may result in significant problems. Thus, content which is likely to cause problems if being posted automatically is allowed to be posted manually after the user makes revisions to the content. This can accordingly prevent the occurrence of such problems.

B. Other Embodiments

The present invention is not limited to the above-described embodiment and may be carried out in various ways without departing from the gist of the present invention. Accordingly, the above-described embodiment is by way of example only in terms of every aspect and should not be interpreted in a limiting manner. For example, each of the steps in the above-described processing may be performed in a different order, or two or more steps may be performed in parallel, as long as such change does not cause any contradiction in the content of the processing As an example of the information providing apparatus for generating unique content that represents the user's real-time feeling, the above embodiment refers to the in-vehicle apparatus 100 that is installed in the vehicle. However, the information providing apparatus is not limited to the described in-vehicle apparatus. For example, the user may use a terminal device (e.g., a smartphone, mobile phone, tablet, wearable device) that the user is bringing into the vehicle as the information providing apparatus and content may be generated in a similar manner to that performed by the above-described in-vehicle apparatus 100.

Furthermore, although some examples of the driving-related information Di and the user-related information Yi have been described in the above embodiment (see FIG. 6), the driving-related information Di and the user-related information Yi are not limited to the described examples. It should be appreciated that the driving-related information Di may include information of images obtained from a drive data recorder installed in the vehicle and that the user-related information Yi may include information obtained from IoT devices (e.g., a facsimile machine, refrigerator, game machine, door intercom) that exist in the user's home.

Furthermore, the above embodiment has described an example in which the automatic posting without approval from the user and the manual posting through the user's operation can be switched according to the value of the automatic posting flag FI. However, other conditions may be employed to determine whether to permit automatic posting of the content. For example, the control unit 110 may be configured to prohibit the automatic posting of the content if the generated content includes at least one item of the user's personal information (e.g., any item in the basic profile information of the user), so that such content can only be posted manually through the user's operation.

Moreover, the above embodiment is configured to obtain user's audio data and send it to the analysis server 200 in order to analyze and determine the user's feeling, but the user's other biological data, such as facial image data and heart-rate data, may be obtained instead of the audio data, and sent to the analysis server 200. Such facial image data of the user may be obtained by using, for example, a drive data recorder having a camera; and such heart-rate data may be obtained by using, for example, a wearable device carried with the user.

The term "unit," as used herein, is not intended to simply mean a physical structure, but rather, the processing to be performed by a "unit" may be implemented through the use of software. Moreover, the processing to be performed by a "unit" or a "device" may be implemented by two or more physical structures or devices, or the processing to be performed by two or more "units" or "devices" may be implemented by a single physical means or device.

The order of the steps in the processing described herein may be changed as appropriate, or two or more of the steps may be performed in parallel, to the extent that such change causes no contradiction in the content of the processing.

A program for executing the processing described herein may be stored in a storage medium. With the use of such storage medium, the program stored in the medium can be installed on a computer that constitutes the in-vehicle apparatus 100. The storage medium storing the program may be a non-transitory storage medium. Examples of such non-transitory storage medium include, but are not particularly limited to, CD-ROMs.

According to the present invention, a user can generate and post unique content that vividly reflects the real-time feeling of the user.

What is claimed is:

1. An information providing apparatus comprising:
an acquisition section that acquires driving-related information and/or user-related information, wherein:
the driving-related information indicates a current position of a vehicle, a destination of the vehicle and/or traffic conditions around the vehicle; and
the user-related information is related to a user in the vehicle;
an input section that inputs biological data of the user;
a transmission section that transmits the input biological data to an analysis server;
a reception section that receives, from the analysis server, a result of analysis of the user's feeling, the analysis being made by the analysis server based on the biological data;
a storage section that stores a plurality of types of templates, wherein each template is a partial statement including at least one variable;
a generation section that:
selects one of the templates based on the acquired driving-related information and/or user-related information; and
automatically generates content based on the acquired driving-related information and/or user-related information and based on the received result of analysis of the user's feeling, wherein the automatically generated content incudes the selected template and the generation section replaces the at least one variable with a word, a sign or a pictogram associated with the result of analysis of the user's feeling; and
a posting control section that determines the automatically generated content is permitted to be posted automatically and transmits the automatically generated content to a posting site without obtaining the user's confirmation such that the automatically generated content becomes accessible to users of the posting site.

2. The information providing apparatus according to claim 1, comprising a memory storing a determination flag for determining whether to permit automatic posting of the automatically generated content,
wherein the posting control section transmits the generated content to the posting site when the determination flag indicates that the automatic posting of the automatically generated content is permitted.

3. The information providing apparatus according to claim 2, wherein the posting control section transmits the automatically generated content to the posting site according to the user's manual operation of posting, when the determination flag indicates that the automatic posting of the automatically generated content is not permitted.

4. The information providing apparatus according to claim 3, wherein the plurality of types of templates for the content is allowed to be made and edited by the posting site or by the user.

5. The information providing apparatus according to claim 1, wherein the posting control section transmits the automatically generated content to the posting site only when the automatically generated content does not include personal information.

6. The information providing apparatus according to claim 1, wherein the driving-related information includes images obtained from a drive data recorder installed in the vehicle.

7. The information providing apparatus according to claim 1, wherein user-related information includes a name, an age, a date of birth, an address, or a telephone number of the user.

8. The information providing apparatus according to claim 1, wherein user-related information includes schedule information indicating a schedule for the user.

9. The information providing apparatus according to claim 1, wherein user-related information includes music information for identifying a music the user is listening to in the vehicle.

10. The information providing apparatus according to claim 1, wherein storage section stores a uniform resource locator for the posting server.

11. The information providing apparatus according to claim 1, wherein storage section stores an account information to post content on the posting server, wherein the account information includes an ID and a password of the user.

12. The information providing apparatus according to claim 1, wherein the posting control section transmits the automatically generated content to the posting site only when the automatically generated content does not include private information.

13. A non-transitory computer-readable storage medium storing a program executed by an information providing apparatus, the program causing the information providing apparatus to function as:
an acquisition section that acquires driving-related information and/or user-related information, wherein:
the driving-related information indicates a current position of a vehicle, a destination of the vehicle and/or traffic conditions around the vehicle; and
the user-related information is related to a user in the vehicle;
an input section that inputs biological data of the user;
a transmission section that transmits the input biological data to an analysis server;
a reception section that receives, from the analysis server, a result of analysis of the user's feeling, the analysis being made by the analysis server based on the biological data;
a storage section that stores a plurality of types of templates, wherein each template is a partial statement including at least one variable;
a generation section that:

selects one of the templates based on the acquired driving-related information and/or user-related information; and automatically generates content based on the acquired driving-related information and/or user-related information and based on the received result of analysis of the user's feeling, wherein the automatically generated content incudes the selected template and the generation section replaces the at least one variable with a word, a sign or a pictogram associated with the result of analysis of the user's feeling; and a posting control section that determines the automatically generated content is permitted to be posted automatically and transmits the automatically generated content to a posting site without obtaining the user's confirmation such that the automatically generated content becomes accessible to users of the posting site.

* * * * *